Aug. 22, 1961  I. R. BRENDHOLDT  2,996,946
OPTICAL DEVICE INCLUDING GATING CIRCUITS, ADJUSTABLE
IN TIME AND DURATION
Filed Jan. 20, 1956

*INVENTOR.*
I. R. BRENDHOLDT
BY
ATTYS.

2,996,946
OPTICAL DEVICE INCLUDING GATING CIRCUITS, ADJUSTABLE IN TIME AND DURATION

Irving R. Brendholdt, Mount Vernon, N.Y., assignor, by mesne assignments, to the United States of America as represented by the Secretary of the Navy
Filed Jan. 20, 1956, Ser. No. 560,469
6 Claims. (Cl. 88—1)

This invention relates to gating circuits and more particularly for gating an image tube responsive to light in accordance with reflections from a pulsed illuminating source.

In prior known sighting systems, a limitation in night visual target illumination by a search light from a point near the observer is imposed by the inability of the observer to see the target because of atmospheric back-scattering of the search light beam. This back-scattering is likewise detrimental to the image picked up by an electron image tube, as an inconoscope camera tube, or the like, in that the image is blurred or possibly indistinguishable by reason of the interference of the back-scattered light. This is true whether the illuminating source is pulsed or continuous.

In the present invention the illuminating source is pulsed and these pulses are utilized in triggering a gating circuit controlling the light responsiveness of the iconoscope, or the like, the gating circuit being controllable in delay time and in duration to account for the transit time of light travel. In this manner the iconoscope camera tube, or the like, can be adjusted to exactly pick-up the reflected light from the target only and to eliminate all intermediate back-scattered light reflections. It is therefore a general object of this invention to provide a gating circuit for producing output gated voltages in correspondence with initiating or triggering pulses in which the output gated voltages can be adjusted in time delay following the triggering pulses and can be adjustable in voltage duration.

These and other objects, advantages, features and uses will become more apparent as the description proceeds when considered together with the acompanying drawing in which.

Figure 1:
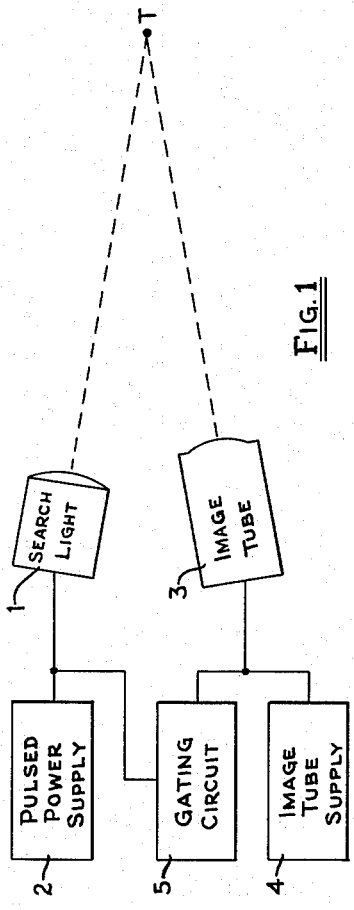
FIG. 1 is a block diagram of one illustrated environment of the invention.

Referring more particularly to FIG. 1, an illuminating source, as a search light 1 is pulsed by a pulsed power supply 2 in any manner well understood by mechanics skilled in the art. The searchlight 1 produces a pulsed light beam which beam can be reflected from a target T back to an electron image tube, such as an iconoscope camera tube 3. The image tube 3 is powered by a supply source 4 in any manner well understood in the art. In the conductors from the image tube supply source 4 and the image tube 3 is coupled a gating circuit 5 which has a conductor coupled into the pulse power supply 2 to the search light 1 for pulsing the receptiveness of the image tube 3 in correspondence with the illuminating pulses.

Figure 2:
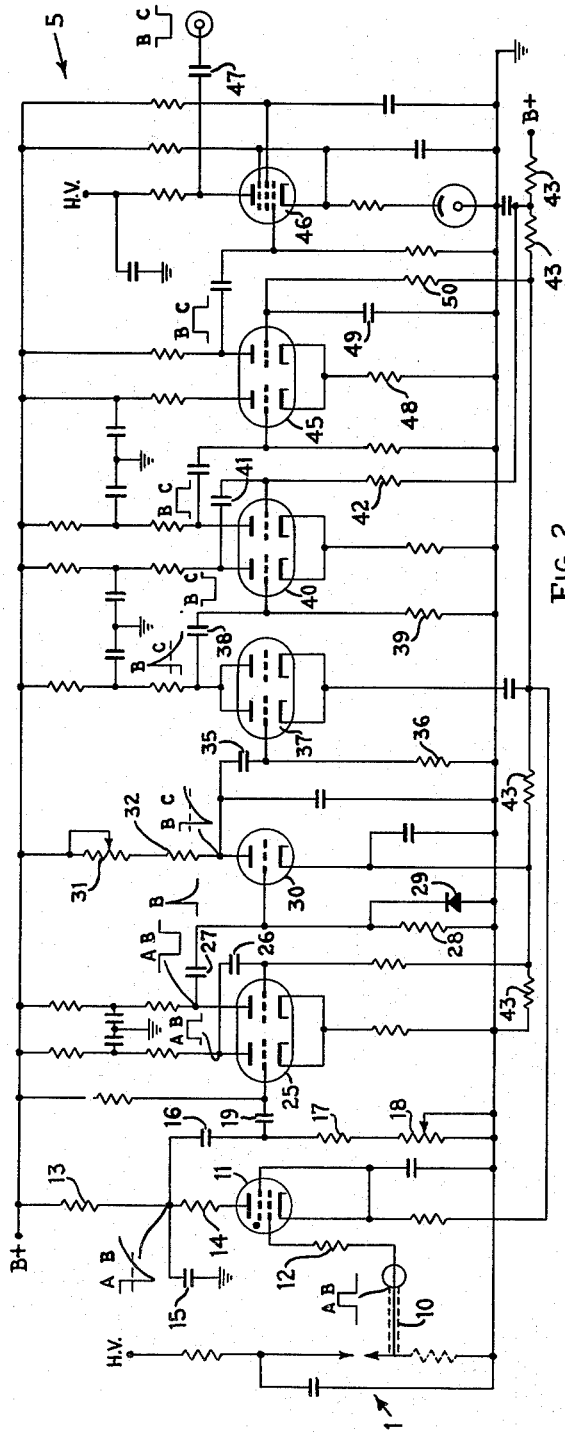
FIG. 2 is a schematic wiring diagram of the gating circuit of FIG. 1.

Referring to FIG. 2, where a schematic wiring diagram of the gating circuit 5 is shown, a conductor 10 coupled to one electrode of the searchlight lamp circuit connects the control grid of a gas discharge tube 11 through a fixed resistor 12. The gas discharge tube 11 has anode and cathode voltages supplied thereto in the usual and well known manner, the anode voltage being supplied through the resistors 13 and 14 in series. The terminal of the resistors 13 and 14 is coupled to one plate of a condenser 15, the other plate thereof being connected to ground. The terminal of the resistors 13—14 and the condenser 15 is also serially connected through a condenser 16, a fixed resistor 17, and a variable resistor 18 to ground. The normal state of the gas discharge tube 11 is nonconductive at which time the condenser 15 will charge to the anode supply voltage level. Upon discharge of the tube 11 by reason of a pulse entering via conductor 10 to the control grid thereof the condenser 15 will be discharged for the duration of the triggering pulse and will thereafter charge in accordance with the adjustment of the variable resistor 18 producing an exponential wave at the anode. The leading edge of the wave produced on the anode of the gas discharge tube 11 will coincide in time with the leading edge of the triggering pulse on the grid. For the purpose of illustrating the invention let the leading edge be identified by the reference character A and subsequent leading or trailing edges be identified by the reference characters B and C. The trailing edge on the exponential wave produced on the anode of the gas discharge tube 11 will terminate at a point B with respect to time where conduction ceases in accordance with the adjustment of the variable resistor 18. That is, the time interval between A and B is adjustable by the variable resistor 18.

The terminal of the condenser 16 and resistor 17 is coupled through a condenser 19 to the grid in the first section of a monostable or one-shot multivibrator tube illustrated herein as a double triode tube 25. The double triode tube has anode and cathode voltages supplied thereto in a manner well understood in the art, the anode of the first section being coupled through a condenser 26 to the grid of the second section. The leading edge A of the exponential wave produced on the anode of the gas discharge tube 11 will trigger the multivibrator 25 to produce the leading edge A of a square wave on the anode of the first section and a trailing edge B at the cut-off point B in the exponential wave of gas discharge tube 11 producing a positive square wave on the anode of the first section. This positive square wave will produce a negative square wave on the anode of the second section of the multivibrator tube 25 which negative square wave is differentiated by the differentiating circuit consisting of a condenser 27 in series with a resistor 28 to ground. In parallel with the resistor 28 is a diode or rectifier 29 which clips off the negative portion of the differentiated wave from the anode of the second section of multivibrator tube 25. The positive portion B of the differentiated wave corresponds to the trailing edge B of the square wave produced on the anode of the second section of multivibrator tube 25. This positive pulse B is fed into the grid of a triode conduction tube 30 having anode and cathode voltages impressed thereon as is well understood in the art, the anode voltage being supplied serially through a variable resistance 31 and a fixed resistance 32. The leading edge B of the negative voltage wave produced by the tube 30 corresponds in time to the trailing edge B of the tube 25 and the positive pulse B of the differentiating circuit. The tube 30 produces an anode exponential wave, the cut-off point C of the tube 30 being positioned in time following the leading edge B in accordance with the adjustment of the variable resistor 31. That is, the time duration between B and C of the exponential wave is adjustable by the variable resistor 31.

The anode output of the triode tube 30 is coupled through a condenser 35 and a resistor 36 serially to ground, the terminal of 35 and 36 being connected to the grid of an inverter tube 37 to produce a positive exponential wave B—C corresponding to the negative exponential wave on the anode of the triode tube 30. The anode output of the inverter tube 37 is coupled through a condenser 38 and a resistor 39 to ground, the terminal of 38—39 being coupled to the grid of the first section of a double triode monostable or one-shot multivibrator 40. The anode and cathode supply voltages are coupled in the usual and well known manner, the anode of the first section being coupled through a condenser 41 to the grid of the second section, this grid being coupled through a resistor 42 to a point in a voltage divider circuit 43 supplied by a positive D.C. potential. The positive exponential wave B—C presented on the grid of the first section of tube 40 will produce a negative square wave having leading and trailing edges B—C on the anode thereof which, when operative on the grid of the second section of tube 40, will produce a positive square wave with leading and trailing edges B and C on the anode of the second section of tube 40. As now may become apparent, the leading edge B of the positive square wave on the anode of the second section of tube 40 is varied in time with respect to the leading edge A of the triggering pulse coming via conductor 10 by the variable resistor 18 and the trailing edge C of this wave is adjustable by the variable resistor 31 to produce a square wave delayed in time by 18 and controlled in duration by 31 for an output gating pulse. This output gating pulse from the anode of the second section of tube 40 is herein illustrated as being amplified by the amplifier tubes 45 and 46 to produce an output through the condenser 47 to the image tube light responsive circuits. The amplifier tube 45 herein illustrated is a cathode follower tube in which the cathodes are coupled in common through a resistor 48 and a condenser 49 to the grid of the second section thereof, this grid being coupled through a resistor 50 to the voltage divider circuit 43 supplied by the positive D.C. voltage. The number of stages of amplification is immaterial and inverter or inverter amplifier tubes may be used, where desirable, to produce either positive square waves or negative square waves for the image tube, or the like, depending on whether the output circuit is to be coupled to the cathode or grid circuit of the iconoscope camera tube for gating purposes. The various amplifiers illustrated herein have anode and cathode voltages supplied thereto in the usual manner well understood by mechanics skilled in the art.

While many modifications and changes may be made in the constructual details or wiring features of this invention, it is to be understood that many modifications and changes may be made therein without departing from the spirit and scope of this invention. For example, the variable resistors 18 and 31 may have various values, as desired, although it has been found desirable in this application of this gating circuit for the variable resistor 18 to be of a value to delay the initial pulse from .5 to 100 microseconds and the variable resistor 31 to be of a value to control the gating pulse from .5 to 50 microseconds.

What is claimed is:

1. In an optical sighting system comprising; a pulsed light source for transmitting a pulsed beam of light to a target; a light sensitive device for detecting light pulses reflected from the target; means gating said light sensitive device to minimize the reception of reflected back-scattered light, said means including an adjustable delay network coupled between said pulsed light source and a multivibrator means for adjustably controlling a delay in the time duration of pulses to said multivibrator means causing conduction and non-conduction periods of said multivibrator means producing a square wave for each light pulse of a time duration corresponding to the time duration of the delayed light pulse; and means coupled to said multivibrator means for accepting the trailing edge of each square wave to produce a second square wave and for controlling the duration of said second square wave, said second multivibrator means being coupled to gate said light sensitive device by said second square waves whereby said light sensitive device is made sensitive for pulsed target reflections only for the short interval of time that each target reflection is due back to the light sensitive device.

2. In an optical sighting system comprising; a pulsed light source for transmitting a pulsed beam of light to a target; a light sensitive device for detecting light pulses reflected from the target; means gating said light sensitive device to minimize the reception of reflected back-scattered light, said means including an adjustable delay network coupled between said pulsed light source and a first multivibrator means for adjustably controlling a delay in the time duration of pulses to said first multivibrator means causing conduction and non-conduction periods of said first multivibrator means producing a square wave for each light pulse of a time duration corresponding to the time duration of the delayed light pulse; a differentiating network coupled to the output of said first multivibrator means for differentiating the square wave output thereof; clipping means coupled to said differentiating means for clipping the differentiated wave corresponding to the square wave leading edge; pulse duration control means coupled to the output of said differentiating network to produce an exponential wave initiated by the output of said differentiating network and of a duration set by the control means; and a second multivibrator means coupled to said pulse duration control means causing conduction and non-conduction periods of said second multivibrator for producing second square waves having a leading edge corresponding to the trailing edge of the first-mentioned square wave and of a duration to the trailing edge set by said control means to pulse said light sensitive device to receive light only during said second square wave pulses.

3. A gating circuit for producing gating pulses in time and duration in accordance with an initiating pulse source comprising, an initiating pulse source, a one-shot multivibrator means coupled through an adjustable delay network to said initiating pulse source for developing conduction and non-conduction periods in accordance with the duration of said initiating pulse thereby generating a square wave for each initiating pulse, said delay network being adjustable to delay the trailing edge of said square wave a predetermined time interval after said initiating pulse, differentiating and clipping means coupled to the output of said one-shot multivibrator means for eliminating the leading edge of said square wave, a discharge means coupled to the output of said one-shot multivibrator means through said differentiating and clipping means and triggered by said trailing edge for producing an exponential wave form, adjustable means coupled to said discharge means for controlling the duration of said exponential wave, a second multivibrator means for developing conduction and non-conduction periods in accordance with the duration of each exponential wave thereby producing second square waves coupled to said discharge means to produce a second square wave for each exponential wave in correspondence with the duration of said exponential wave whereby square wave gating pulses adjustable in time to follow said initiating pulses and adjustable in duration are produced.

4. A gating circuit as set forth in claim 3 wherein said adjustable delay network consists of a discharge tube having an anode, cathode, and control grid with the control grid coupled to the initiating pulse source and the anode coupled to a direct current voltage source, to a condenser connected to ground, through a variable resistor to ground, and to the input of said one-shot multivibrator means whereby the condenser is discharged by said discharge tube upon the introduction of the leading edge of said initiating pulse on the grid thereof and the charging rate of said condenser is controlled by said variable resistor to control the duration of the square wave produced by said one-shot multivibrator means.

5. A gating circuit as set forth in claim 4 wherein said discharge means coupled to the output of said one-shot multivibrator means is a triode tube having its grid coupled to the differentiating and clipping means output and its anode coupled to the input of said second multivibrator means, and said adjustable means coupled to said discharge means is a variable resistor in the anode voltage supply circuit of said triode tube whereby the duration of the exponential wave may be controlled.

6. A gating circuit for producing gating pulses in time and duration in accordance with an initiating pulse source comprising; an initiating pulse source; a first discharge tube having a grid coupled to said initiating pulse source and an anode coupled to an anode supply voltage, through a condenser to ground and through a variable resistance to ground to produce an exponential wave; a one-shot double triode multivibrator, each triode coupled to produce square waves each in accordance with the duration of said exponential wave, one triode having the grid thereof coupled to the anode of said discharge tube and the grid of the other triode being coupled to the anode of said one triode whereby the leading edge on the anodes of the double triode multivibrator corresponds to the leading edge of said exponential wave and the trailing edge corresponds to a predetermined voltage level on said exponential wave; a differentiating and clipping network coupled between the output of said other triode and a second discharge tube to differentiate the square wave output into first and and second occurring pulses corresponding in time to said square wave leading and trailing edges, respectively, and to clip each first occurring pulse thereof to produce a differentiated wave with a leading edge corresponding to the trailing edge of the one-shot triode multivibrator tube square wave, said second discharge tube having a voltage controlling means in the anode supply circuit thereto for controlling the recovery time of said differentiated wave providing an exponential trailing edge; and a second multivibrator having limits of conduction for input voltages, said second discharge tube having the anode thereof coupled to the input of said second multivibrator for developing conduction and non-conduction periods thereof in accordance with the leading and trailing edges of said last-mentioned differentiated wave producing square waves whereby the second multivibrator produces square waves on an output thereof each at a time interval after the initiating pulse set by said variable resistor and of a wave duration set by said voltage controlling means.

References Cited in the file of this patent
UNITED STATES PATENTS

| | | |
|---|---|---|
| 2,402,916 | Schroeder | June 25, 1946 |
| 2,409,030 | Frankel et al. | Oct. 8, 1946 |
| 2,428,058 | Wise | Sept. 30, 1947 |
| 2,432,454 | Skellett | Dec. 9, 1947 |
| 2,502,454 | Grieg | Apr. 4, 1950 |
| 2,521,016 | Miller | Sept. 5, 1950 |
| 2,648,836 | Newby et al. | Aug. 11, 1953 |